(No Model.)
H. ROHRER.
TIRE.
No. 460,185. Patented Sept. 29, 1891.
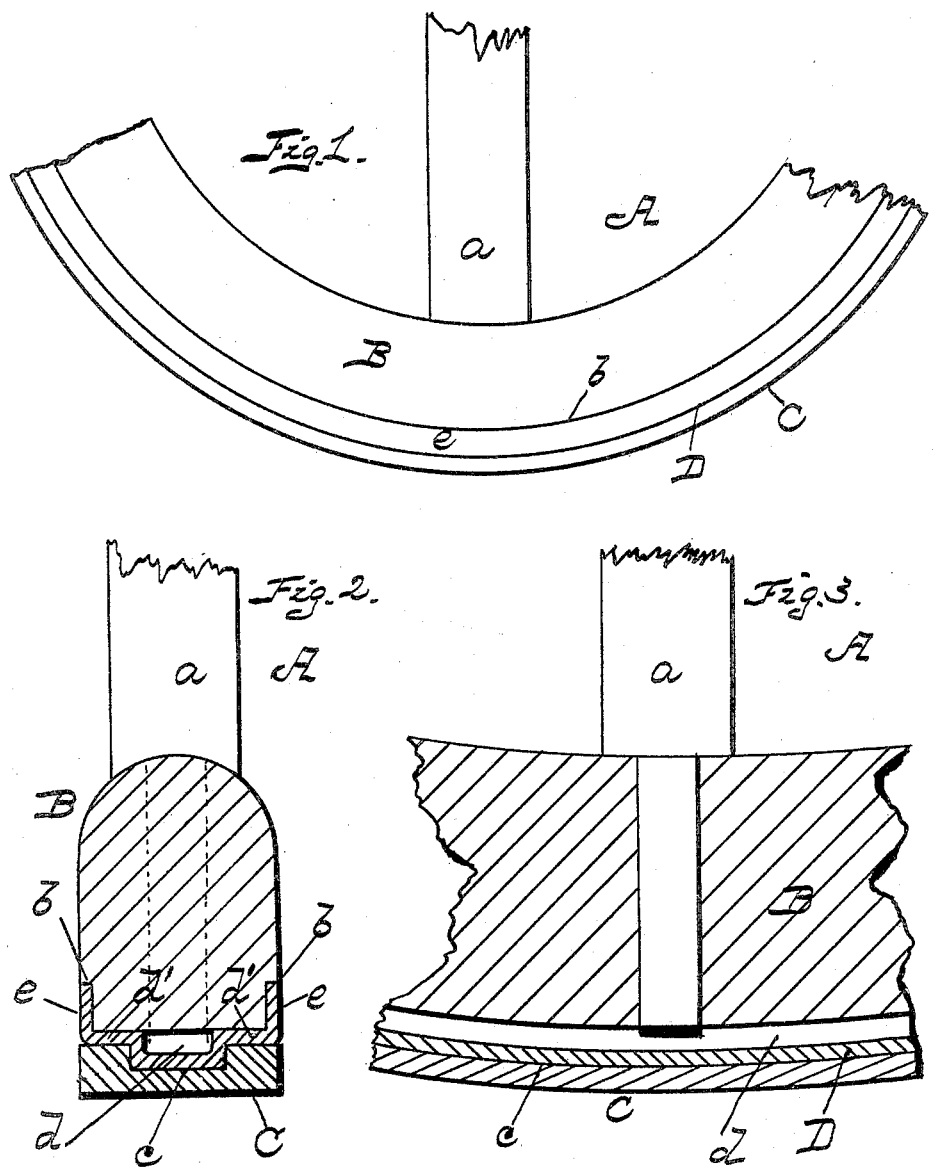
WITNESSES
Jas. B. Clarke
M. M. Mason
INVENTOR
Henry Rohrer
by E. H. Bates Attorney

UNITED STATES PATENT OFFICE.

HENRY ROHRER, OF HAGERSTOWN, MARYLAND.

TIRE.

SPECIFICATION forming part of Letters Patent No. 460,185, dated September 29, 1891.

Application filed May 25, 1891. Serial No. 393,953. (No model.)

*To all whom it may concern:*

Be it known that I, HENRY ROHRER, a citizen of the United States, residing at Hagerstown, in the county of Washington and State of Maryland, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to improvements in vehicle-wheels; and it consists in the novel construction of the same, whereby the tire thereof is applied thereto without the use of bolts, screws, or the like, and water as well as sand, &c., is prevented from entering between the improved tire and felly thereof, all as will be hereinafter more fully explained.

The annexed drawings, to which reference is made, fully illustrate my invention, in which—

Figure 1 represents a side view of part of a vehicle-wheel, showing my device applied thereto. Fig. 2 is a vertical cross-sectional view of the same; and Fig. 3 is a vertical longitudinal sectional view.

Referring by letter to the accompanying drawings, A designates a section or portion of a wheel; *a*, the spokes, applied in the usual manner, and B indicates the felly, which latter is constructed in the well-known manner, having on its sides and rear or at its periphery the rabbeted portion *b*.

C represents the tire, the inner face of which is provided with a groove *c*, while the thread thereof is left plain; and D designates a plate which is interposed between the inner face of the tire and the outer face of the felly. This plate is constructed with a depression or groove *d*, lateral flat horizontal portions *d' d'*, upon which the felly rests, and turned-up sides *e e*, which latter are bent at right angles, or nearly so, to the main portion *d' d'*, and the turned ends are made to fit the rabbeted portions of the felly, thus preventing said plate from sidewise movement or accidental displacement. Upon this interposed plate is placed the tire of the wheel. The groove thereof receives the depressed or grooved portions of the plate, and form a tight connection, which will not allow the tire to move in any direction. Thus it will be seen that the plate is firmly held in position, and the latter in turn firmly secures the tire to the felly without the use of bolts, screws, or the like, and forms such close connections that sand, &c., as well as water, are excluded and prevented from entering between the tire or plate and the felly; also, it will be readily observed that by my construction of the tire and its interposing plate a groove is provided and the ends of the spokes which may protrude beyond the outer face of the felly are protected, as the same will enter the groove. Thus the extreme ends of the spokes have no bearing on the tire or plate. The tenon, being relieved from strain, will not become injured, as the shouldered portion thereof rests entirely upon the felly, and the device is simple in construction, easily applied to a felly, durable as well as ornamental, and at the same time cheap to manufacture.

In some cases, if desirable, I can reverse the construction of my device by making a groove centrally in the outer face of the felly, reversing the depression or groove in the plate and forming a projection on the inner face of the tire, and connecting all also without bolt-screws or the like, without departing from the spirit of my invention.

Having thus described my invention, what I claim, and desire to secure by Letters Patent, is—

The combination, with the felly and grooved tire, of the plate interposed between said tire and felly, said plate constructed with horizontal portions *c d'*, providing a groove *d* and flanges *e*, bent at right angles to the horizontal portion, and formed of uniform thickness throughout said groove in connection with the periphery of the felly, providing a space around the entire wheel, all substantially as described.

In testimony whereof I affix my signature in presence of two witnesses.

HENRY ROHRER.

Witnesses:
A. YINGLING,
MAYNARD YINGLING.